United States Patent [19]

Onishi et al.

[11] Patent Number: 4,955,954
[45] Date of Patent: Sep. 11, 1990

[54] MOTOR-DRIVEN CONTROL APPARATUS

[75] Inventors: Masayoshi Onishi; Hiromasa Ozawa, both of Hyogo, Japan

[73] Assignee: Mitsubishi Denki Kabushiki Kaisha, Tokyo, Japan

[21] Appl. No.: 374,894

[22] Filed: Jul. 3, 1989

[30] Foreign Application Priority Data

| Jul. 4, 1988 | [JP] | Japan | 63-88941[U] |
| Jul. 4, 1988 | [JP] | Japan | 63-88942[U] |
| Jul. 29, 1988 | [JP] | Japan | 63-101286[U] |

[51] Int. Cl.$^5$ .............................. F16D 27/00
[52] U.S. Cl. ...................... 192/0.02 R; 192/84 C
[58] Field of Search .............. 192/0.02 R, 84 C, 20; 123/361, 399; 180/178

[56] References Cited

U.S. PATENT DOCUMENTS

| 2,880,595 | 4/1959 | McGuffey et al. | 192/84 C |
| 4,212,272 | 7/1980 | Hawk | 123/361 |
| 4,237,742 | 12/1980 | Barthruff | 180/178 |
| 4,343,385 | 8/1982 | Kosuda et al. | 192/0.02 R |

FOREIGN PATENT DOCUMENTS

| 249489 | 12/1987 | European Pat. Off. | 192/84 C |
| 54-45443 | 10/1979 | Japan | 192/84 C |
| 63-247128 | 10/1988 | Japan | 180/178 |
| 994515 | 6/1965 | United Kingdom | 192/84 C |

Primary Examiner—Leslie A. Braun
Assistant Examiner—Nicholas Whitelaw
Attorney, Agent, or Firm—Sughrue, Mion, Zinn, Macpeak and Seas

[57] ABSTRACT

A motor-driven apparatus for controlling a throttle valve includes first and second clutch plates 11,13 mounted on an output shaft 5 opposite each other, with the second clutch plate rigidly secured to the output shaft. The first clutch plate is urged by a spring 12 toward an output gear 10 rotatably mounted on the output shaft. When the second clutch plate is magnetized, the first clutch plate is attracted to it for engagement causing the second clutch plate to rotate with the first clutch plate and the output gear, thus transmitting the torque of a motor 18 to the output shaft. An axial gap between the second clutch plate and a yoke 15 ensures rotation of the second clutch plate even when foreign substances such as iron particles are trapped in the gap because the foreign substances will easily be displaced out of the gap by centrifugal force during rotation.

4 Claims, 5 Drawing Sheets

MOTOR-DRIVEN CONTROL APPARATUS

BACKGROUND OF THE INVENTION

1. Field of the Invention 7 is a second stepped gear rotatably mounted on the second support shaft 3 and in mesh with the first and third stepped gears 6 and 8.

Designated 9 is a fourth stepped gear rotatably mounted on the third support shaft 4 and in mesh with the third stepped gear 8.

Designated 10 is an output gear having its hub 10a rotatably mounted on the output shaft 5. The output gear 10 is in mesh with the fourth stepped gear 9.

These gears from the first stepped gear 6 to the output gear 10 form a reduction gear train.

Reference number 11 denotes a first clutch plate having a large number of teeth 11a on its circumference. The first clutch plate 11 is sleeved over the output shaft 5 so that it can be axially moved, and is also mounted to the side of the output gear 10 through a return spring 12.

A second clutch plate 13 has a guide portion 13a into which the output shaft 5 is press-fitted and which extends in a direction opposite to the output gear 10. The second clutch plate 13 has a large number of pins 13b that engage the teeth 11a when the first clutch plate 11 moves toward it along the axis of the output shaft 5.

Denoted 14 is a sleeve bearing fitted over the guide portion 13a of the second clutch plate 13. 15 is a clutch yoke fitted over the sleeve bearing 14 in which a coil 16 is installed. A part of the inner circumferential surface of the clutch yoke 15 faces the outer circumferential surface of the second clutch plate 13 in a radial direction with a small axially extending gap therebetween.

The first clutch plate 11, second clutch plate 13, clutch yoke 15 and the clutch coil 16 form an electromagnetic clutch device. The area where the second clutch plate 13 faces the clutch yoke 15 is set sufficiently large to form a magnetic path.

Designated 17 is a first casing secured to the mounting plate 1 by screws (not shown). The first casing 17 supports the first through third support shafts 2, 3, 4 and the output shaft 5 at the ends opposite to those supported on the mounting plate 1. The first casing 17 also rigidly holds the clutch yoke 15.

A motor 18 mounted on the outside of the first casing 17 has a gear (not shown) mounted on its shaft that engages with the first stepped gear 6.

A second casing 19 is mounted on the mounting plate 1 by screws (not shown) and encloses the aforementioned components from the first support shaft 2 to the motor 18.

A rotatable lever 20 is mounted on the end of the output shaft 5 that projects from the mounting plate 1. The rotatable lever 20 is formed basically circular and connected to one end of an external load drive wire 21 whose other end is coupled to the throttle valve (not shown). The rotatable lever 20 also has a groove 20a formed on its circumference on which the external load drive wire 21 is wound.

Now, the operation of this mechanism will be described.

As the motor 18 is rotated, the rotation is transmitted through the first to fourth stepped gears 6 to 9 to the output gear 10 and the first clutch plate 11.

With the motor 18 rotating, when the clutch coil 16 of the electromagnetic clutch device is not energized, i.e., when the electromagnetic clutch device is turned off, the second clutch plate 13 is not magnetized, so that as shown in FIG. 5A the first clutch plate 11 is not attracted to the second clutch plate 13. As a result, the first clutch plate 11 is urged by the return spring 12 toward the output gear 10 and the torque of the motor 18 is not transmitted to the output shaft 5.

Thus, the output gear 10 and the first clutch plate 11 will idly rotate on the output shaft 5.

Next, when the clutch coil 16 is energized, i.e., the electromagnetic clutch device is turned on, the second clutch plate 13 is magnetized. As a result, as shown in FIG. 5B, the first clutch plate 11 is attracted to the second clutch plate 13 against the force of the return spring 12, causing the pins 13b of the second clutch plate 13 to engage the teeth 11a of the first clutch plate 11. Then the second clutch plate 13 rotates with the output gear 10 and the first clutch plate 11, transmitting the torque of the motor 18 to the output shaft 5.

The rotatable lever 20 is therefore rotated winding up the external load drive wire 21 on its groove 20a, adjusting the opening of the throttle valve.

When the clutch coil 16 of the electromagnetic clutch device is deenergized, the second clutch plate 13 is demagnetized with the result that the first clutch plate 11 is returned to the original position as shown in FIG. 5A by the action of the return spring 12. This disengages the pins 13b of the second clutch plate 13 from the teeth 11a of the first clutch plate 11, stopping the transmission of the torque of the motor 18 to the output shaft 5.

Because of the construction as shown in FIG. 4, the conventional motor-driven control apparatus has the following drawbacks. If, during manufacture, foreign substances such as iron particles inadvertently get trapped in a small gap between the outer circumference of the second clutch plate 13 and the inner circumference of the clutch yoke 15, the second clutch plate 13 may become locked to the clutch yoke 15 because there is no play between the second clutch plate 13 and the clutch yoke 15. And this results in a failure of the second clutch plate 13 to rotate or in a response delay.

The second clutch plate 13 is securely mounted to the output shaft 5 by press-fitting the output shaft 5 into the guide portion 13a of the clutch plate 13; the sleeve bearing 14 is fitted over the guide portion 13a; the clutch yoke 15 is fitted over the sleeve bearing 14; and the first casing 17 is mounted over the clutch yoke 15. Thus, these four members—the second clutch plate 13, the sleeve bearing 14, the clutch yoke 15 and the first casing 17—are concentrically mounted on the output shaft 5.

Therefore, manufacturing errors with these four members, when combined, will result in the output shaft 5 being mounted inclined, which in turn causes the output shaft 5 to rotate off-center.

Furthermore, since the end of the output shaft 5 on which the rotating lever 20 is mounted projects outwardly from the mounting plate 1, dust may easily be collected on the exposed part of the output shaft 5 between the mounting plate 1 and the rotating lever 20, increasing the frictional resistance to the rotation of the output shaft 5, which in turn deteriorates the shaft rotation performance from the original level.

SUMMARY OF THE INVENTION

This invention has been accomplished to solve the above-mentioned drawbacks experienced with the conventional apparatuses.

It is a primary object of the invention to provide a motor-driven control apparatus which permits the second clutch plate to rotate without being locked if foreign substances such as iron particles are inadvertently trapped between the second clutch plate and the clutch yoke during manufacture, by allowing the second clutch plate to move away from the clutch yoke by a distance equal to the play between them.

It is a second object of the invention to provide a motor-driven control apparatus in which the output shaft can be mounted with a minimum inclination.

It is a third object of the invention to provide a motor-driven control apparatus in which the output shaft can rotate in a desired condition by taking a measure to prevent dust from collecting on the end portion of the output shaft projecting from the mounting plate.

DESCRIPTION OF PREFERRED EMBODIMENTS

Now, preferred embodiments of this invention will be explained in the following.

Figure 1:
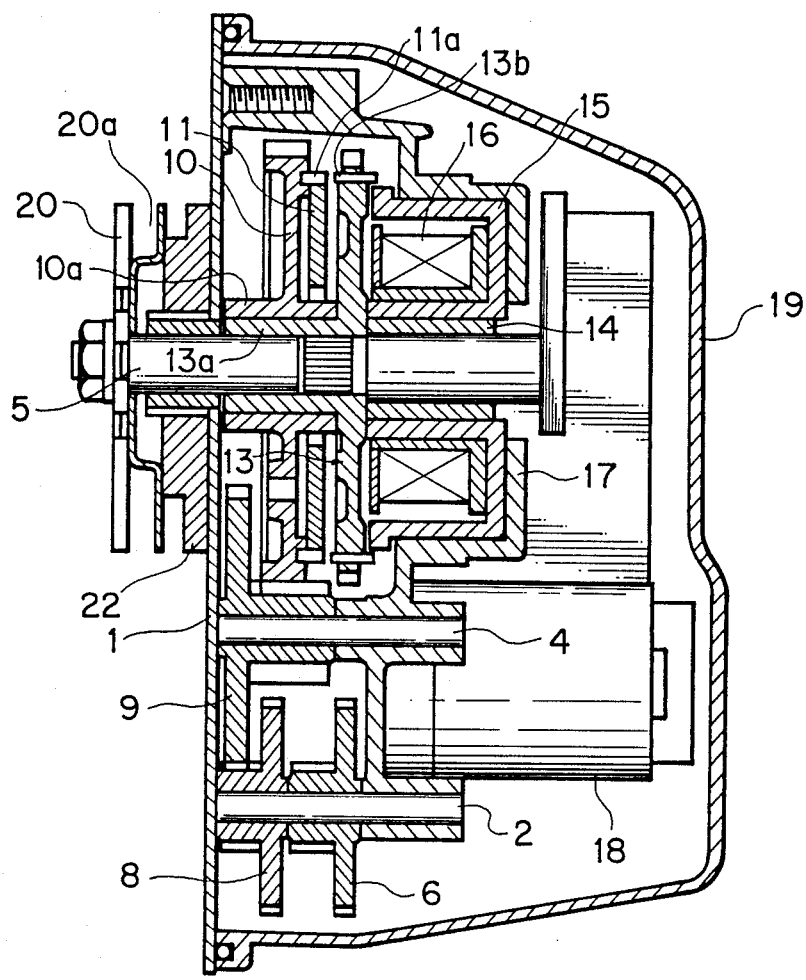
FIG. 1 is a cross-sectional view of a motor-driven control apparatus as one embodiment of this invention.

FIG. 1 shows a cross section of the motor-driven control apparatus as one embodiment of the invention.

Figure 4:
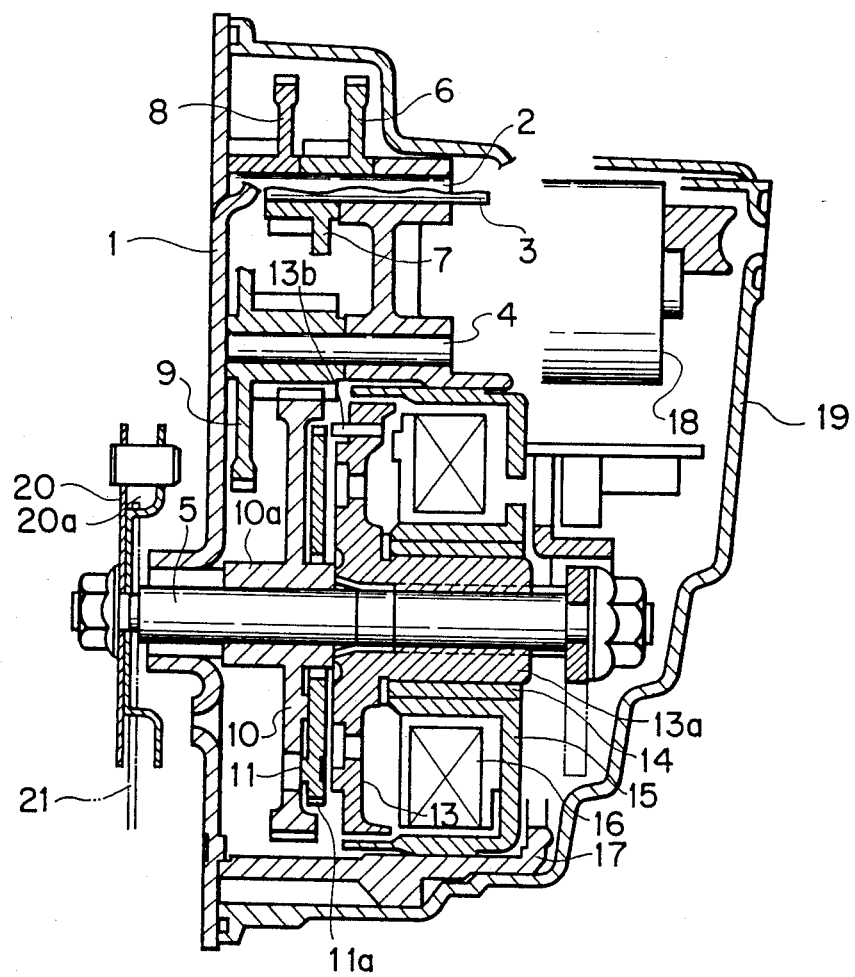
FIG. 4 is a cross-sectional view of a conventional motor-driven control apparatus.

Components in FIG. 1 which are identical with those of FIG. 4 are assigned like reference numerals, and their explanation will not be given.

Reference numeral 13 designates a second clutch plate which has its guide portion 13a—into which the output shaft 5 is press-fitted—extend toward the output gear 10 so that the output gear 10 is rotatably supported on the guide portion 13a.

The second clutch plate 13 is axially opposed to the clutch yoke 15 with a small axially extending gap therebetween. The axially extending area through which the second clutch plate 13 and the clutch yoke 15 face each other is large enough to form a magnetic path. Since the second clutch plate 13 is mounted on the output shaft 5 as described above, the sleeve bearing 14 is directly fitted over the output shaft 5.

Denoted 22 is an annular dust protection member formed of synthetic resin material, such as a sponge, that is easily deformed. The dust protection member 22 is mounted on the mounting plate 1 in such a manner as to close the gap formed between the mounting plate 1 and the rotating lever 20.

Figure 5A:
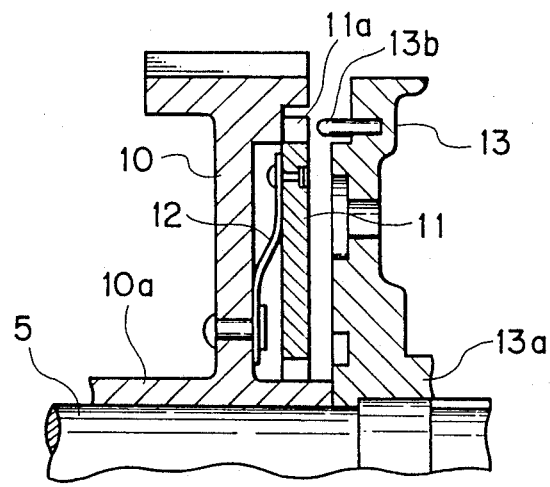
FIGS. 5A and 5B are explanatory views showing the operation of an electromagnetic clutch device.
Figure 5B:
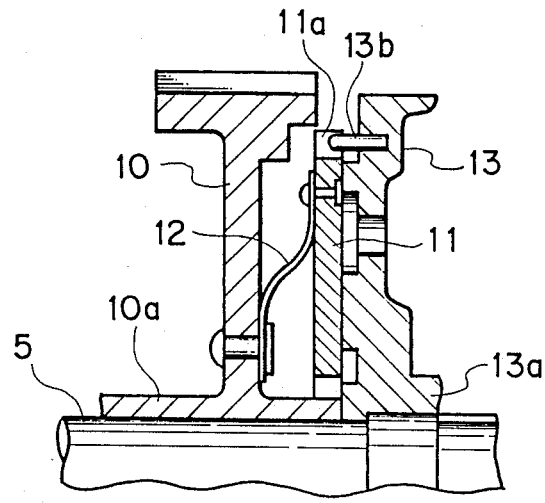

Next, we will explain the operation of the motor-driven control apparatus of this invention as compared with that of the conventional apparatus that is shown in FIGS. 4, 5A and 5B.

With the motor 1 rotating, when the clutch coil 16 of the electromagnetic clutch device is energized, the second clutch plate 13 is magnetized attracting the first clutch plate 11 to it against the force of the return spring 12, with the result that the pins 13b of the second clutch plate 13 engage the teeth 11a of the first clutch plate 11. This causes the second clutch plate 13 to rotate with the output gear 10 and the first clutch plate 11, thus transmitting the torque of the motor 18 to the output shaft 5.

If foreign matter such as iron particles are inadvertently trapped in the gap between the second clutch plate 13 and the clutch yoke 15 during manufacture, the second clutch plate 13, when the electromagnetic clutch device is turned on, can move away from the clutch yoke 15 because of the play, so that the second clutch plate 13 can rotate without being locked.

The foreign substances caught between the second clutch plate 13 and the clutch yoke 15 will gradually be discharged radially outwardly from the gap between the second clutch plate 13 and the clutch yoke 15 while the second clutch plate 13 is rotating.

Since the second clutch plate 13 is prevented from becoming locked to the clutch yoke 15 and can rotate even if there are foreign substances in the gap between the second clutch plate 13 and the clutch yoke 15 that were trapped during manufacture, and since the trapped foreign substances are gradually displaced out of the gap, a highly reliable motor-driven control apparatus can be obtained.

Another feature of this invention is that the output shaft 5 is supported on the first casing 17 through the sleeve bearing 14 and the clutch yoke 15, not through the second clutch plate 13. That is, the second clutch plate 13 is not mounted concentrically between the output shaft and the first casing 17 as it is in the conventional apparatus. This structure eliminates the adverse effects of any machining errors of the internal and external circumferential surfaces of the guide portion 13a of the second clutch plate 13. This in turn virtually eliminates the undesired inclination cf the output shaft 5, thus providing a motor-driven control apparatus with almost no off-centered rotation of the output shaft 5.

A further advantage of the invention is that since the easily deformed dust protection member 22 is mounted on the end portion of the output shaft 5 that projects from the mounting plate 1 to close the gap between the mounting plate 1 and the rotating lever 20, the projected part of the output shaft 5 is protected from dust. Furthermore, as it is easily deformed, the dust protection member 22 will apply almost no frictional resistance to the output shaft 5. Therefore, it is possible to obtain a motor-driven control apparatus in which the output shaft 5 can be rotated in a desired condition.

Figure 2:
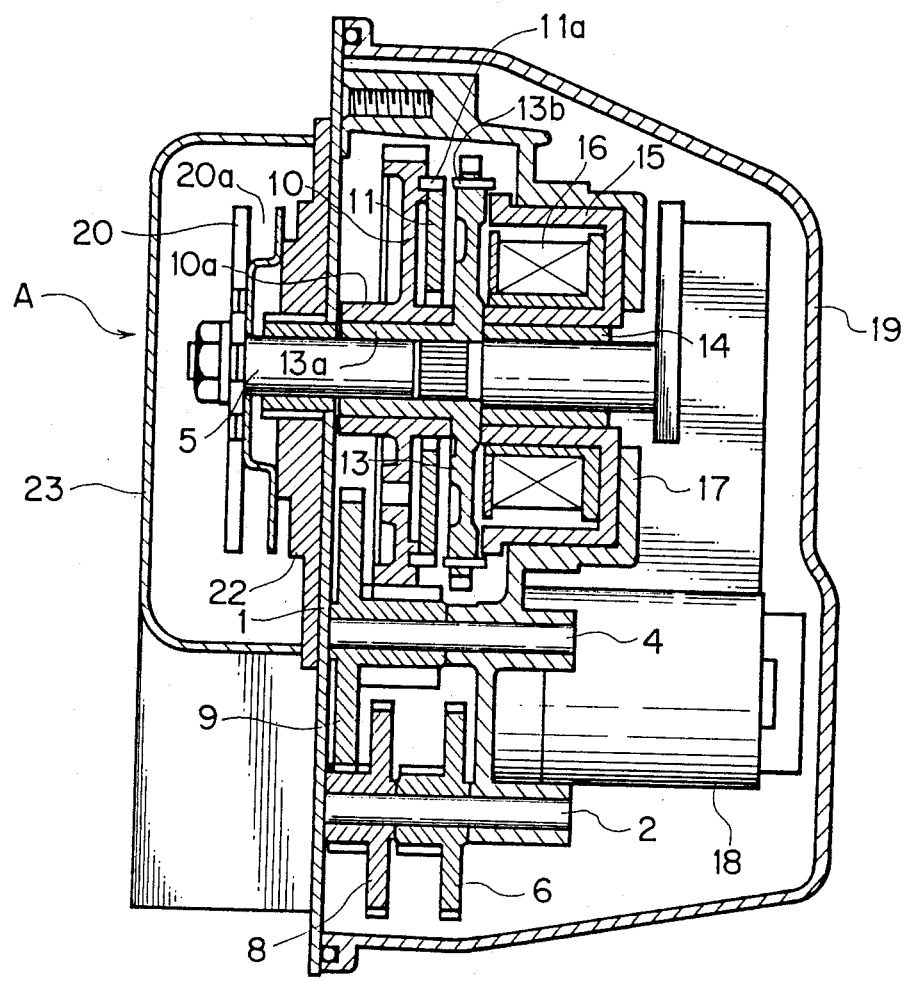
FIG. 2 is a cross-sectional view of a motor-driven control apparatus as a second embodiment of the invention.
Figure 3:
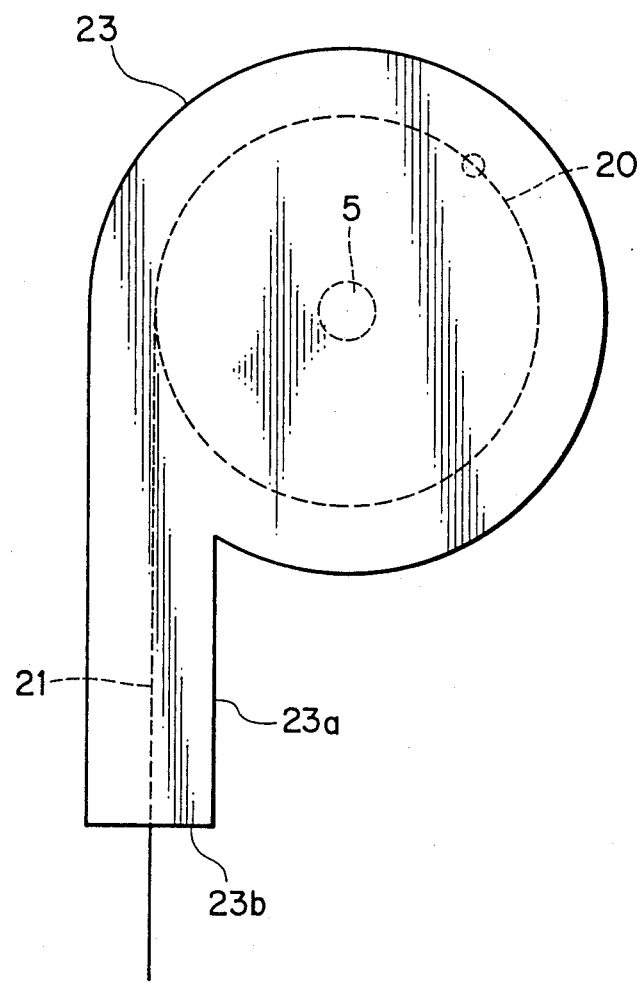
FIG. 3 is a side view of a dust protective cover as seen in the direction of arrow A of FIG. 2.

FIG. 2 is a cross-sectional view showing another embodiment of the motor-driven control apparatus according to the invention. FIG. 3 is a side view of a dust protective cover as seen from the arrow A of FIG. 2.

In FIGS. 2 and 3, the components identical with those of FIG. 1 are given like reference numerals and their descriptions are omitted.

Designated 23 is a dust protective cover which is mounted on the mounting plate 1 so as to enclose the rotating lever 20 and the dust protection member 22. The external load drive wire 21 is drawn into and out of the dust protective cover 23 through an opening 23b formed at the end of a projected portion 23a of the cover 23.

This embodiment has the advantage of further improving the dust proof effect because dust, if any, can enter the apparatus only through the narrow opening 23b of the dust protective cover 23 that encloses the rotating lever 20 and the dust protection member 22.

What is claimed is:

1. A motor-driven control apparatus, comprising:

a plurality of stepped gears (6-9) for transmitting the driving force of a motor (18) to an output gear (10) rotatably mounted on an output shaft (5);

an electromagnetic clutch device including:

a first clutch plate (11) mounted to a side of the output gear through a return spring (12) so that the first clutch plate is urged toward the output gear;

a second clutch plate (13) rigidly secured to the output shaft through a guide sleeve portion (13a) thereof, a second clutch plate being disposed opposite to the first clutch plate; and a clutch yoke (15) externally supported by a casing (17), the clutch yoke containing a clutch coil (16), the clutch yoke being disposed such that an axially circumferential surface of a radially outermost portion thereof is axially opposed to a radially outer, axially circumferential surface of the second clutch plate with an axially extending gap therebetween;

the electromagnetic clutch device being operated such that the first clutch plate is moved away from the second clutch plate by the return spring to idly rotate on the output shaft when the electromagnetic clutch device is off and, when it is on, the first clutch plate is attracted to the second clutch plate to rotatably drive the second clutch plate; and a rotating lever (20) secured to one end of the output shaft, the rotating lever being adapted to drive an external load drive wire (21);

wherein foreign matter lodged in the axially extending gap between the second clutch plate and the clutch yoke is radially expelled from said gap by centrifugal force during the rotation of the second clutch plate.

2. An apparatus according to claim 1, wherein the guide sleeve portion of the second clutch plate extends axially towards the output gear, said output gear is rotatably journaled on the guide sleeve portion, and the clutch yoke is rotatably supported on the output shaft by a sleeve bearing (14) directly fitted over said output shaft.

3. An apparatus according to claims 1 or 2, further comprising an easily deformed, annular dust protection member (22) fixed to a mounting plate (1) through which said one end of the output shaft extends, said dust protection member closing a gap between the mounting plate and the rotating lever.

4. A motor-driven control apparatus, as set forth in claim 3, wherein the dust protection member is formed of a synthetic resin sponge.

* * * * *